US007921893B2

United States Patent
Beehag et al.

(10) Patent No.: US 7,921,893 B2
(45) Date of Patent: Apr. 12, 2011

(54) METHOD AND APPARATUS FOR WELDING OF POLYMER COMPOSITE COMPONENTS

(75) Inventors: Andrew Beehag, Glebe (AU); Kenneth Douglas Horton, MacMasters Beach (AU); Bruce Cartwright, Nightcliff (AU)

(73) Assignee: Advanced Composite Structures Limited, Victoria (AU)

( * ) Notice: Subject to any disclaimer, the term of this patent is extended or adjusted under 35 U.S.C. 154(b) by 0 days.

(21) Appl. No.: 11/534,397

(22) Filed: Sep. 22, 2006

(65) Prior Publication Data

US 2007/0062641 A1   Mar. 22, 2007

(30) Foreign Application Priority Data

Sep. 22, 2005   (AU) ................ 2005905235

(51) Int. Cl.
*B29C 65/00* (2006.01)
*B32B 37/00* (2006.01)
*B32B 41/00* (2006.01)
*C08J 5/00* (2006.01)
*B65C 9/40* (2006.01)
*G05G 15/00* (2006.01)
*B30B 5/02* (2006.01)
*B30B 5/04* (2006.01)
*B30B 15/34* (2006.01)
*B64C 1/00* (2006.01)
*B64C 3/00* (2006.01)
*B64C 5/00* (2006.01)

(52) U.S. Cl. ..... 156/382; 156/285; 156/292; 156/308.2; 156/358; 156/583.3; 244/123.1

(58) Field of Classification Search ............... 156/285, 156/287, 308.2, 308.4, 358, 382, 137, 290, 156/292, 304.1, 304.6, 502, 583.3, 580, 581, 583.1, 583.4, 583.5, 583.6, 583.7, 583.91; 244/123.1, 123.8, 123.9

See application file for complete search history.

(56) References Cited

U.S. PATENT DOCUMENTS 3,694,282 A * 9/1972 Ribbels .............. 156/157
3,964,958 A * 6/1976 Johnston ............. 156/382
3,996,091 A   12/1976 Daunt et al.

(Continued)

FOREIGN PATENT DOCUMENTS

WO   WO 03/011573 A1   2/2003

*Primary Examiner* — Philip C Tucker
*Assistant Examiner* — Brian R Slawski
(74) *Attorney, Agent, or Firm* — Alston & Bird LLP

(57) ABSTRACT

A method and apparatus is disclosed for joining of composites with thermoplastic surfaces. The process includes the location of the said components within a load bearing frame, and bringing the thermoplastic surfaces to be joined into contact. Pressure application devices, in the form of fluid filled bladders, are also located within the frame, and are located such that pressure is applied evenly to said thermoplastic surfaces. Where components have a high level of curve or twist, form blocks that have the approximate shape of the component surface are located between the frame and bladders. Pressure and heat are applied to the joint area, and heat removed while the joint area is maintained under some pressure. A feature of the present invention is the option of using opposing pressure application devices, reducing the need for substantial tooling in order to maintain component location accuracy. A distinct advantage of this invention is the flexibility to join curved or twisted components, or complete the welding of closed assemblies such as wing boxes.

3 Claims, 5 Drawing Sheets

U.S. PATENT DOCUMENTS

| | | | |
|---|---|---|---|
| 4,388,860 A * | 6/1983 | Thies | 100/270 |
| 4,816,106 A * | 3/1989 | Turris et al. | 156/285 |
| 5,116,216 A * | 5/1992 | Cochran et al. | 425/504 |
| 5,304,269 A | 4/1994 | Jacaruso et al. | |
| 5,562,796 A * | 10/1996 | Ertel | 156/498 |
| 5,624,594 A | 4/1997 | Matsen et al. | |
| 5,641,422 A | 6/1997 | Matsen et al. | |
| 5,643,390 A | 7/1997 | Don et al. | |
| 5,645,744 A | 7/1997 | Matsen et al. | |
| 5,710,414 A * | 1/1998 | Matsen et al. | 219/633 |
| 5,717,191 A | 2/1998 | Christensen et al. | |
| 5,723,849 A | 3/1998 | Matsen et al. | |
| 5,728,309 A * | 3/1998 | Matsen et al. | 219/633 |
| 5,793,024 A * | 8/1998 | Matsen et al. | 219/633 |
| 5,808,281 A | 9/1998 | Matsen et al. | |
| 5,863,635 A | 1/1999 | Childress | |
| 5,916,469 A | 6/1999 | Scoles et al. | |
| 5,935,475 A | 8/1999 | Scoles et al. | |
| 5,968,639 A | 10/1999 | Childress | |
| 5,980,665 A | 11/1999 | Childress | |

* cited by examiner

METHOD AND APPARATUS FOR WELDING OF POLYMER COMPOSITE COMPONENTS

CROSS REFERENCE TO RELATED APPLICATIONS

This application claims the benefit of Australian Application No. 2005905235, filed Sep. 22, 2005, which is incorporated herein by reference in its entirety and for all purposes.

FIELD OF THE INVENTION

The present invention relates to joining of polymer composite structures with a thermoplastic surface. In particular, the invention relates to the use of flexible heating and pressure application systems to join two or more such surfaced components together.

BACKGROUND OF THE INVENTION

Joining of structural components made from polymer composite materials, particularly in the aerospace industry, generally involves the use of mechanical fasteners. There are several reasons for this. The components that are joined to make aerospace assemblies often have a complex geometry. Components may be singly or doubly curved, and have corners with tight radii. Additionally, there is a requirement for maintaining tight tolerances in component location and final assembly shape. The process for incorporating mechanical fasteners into a composite assembly is expensive, generally requiring several hours of time on expensive automated machines. In addition, composite materials often do not perform optimally with mechanical fasteners—in most cases assemblies are more efficient when joined with an adhesive.

Adhesives have also been used widely for joining composites, but less widely in the aerospace industry. Most structural adhesive bonding processes require a rigorous surface preparation stage, adding substantial expense to the process. Furthermore, the adhesives generally require elevated and carefully-controlled temperature and pressure in the cure cycle, which mostly involves placing an entire assembly inside an oven or autoclave. In order to obtain tight tolerances expensive tooling is required. This tooling also requires cleaning and surface preparation for each assembly.

An alternative method for joining composite components is to weld components that have a thermoplastic surface. Some advantages in using this process are the potential time, cost and weight savings compared to the use of mechanical fasteners, as well as the potential for easy dismantling of assemblies. However, to provide a widely applicable means of low-cost assembly, this technology also has to allow easy and accurate means of location. The ease with which this can be done is closely related to the required welding pressure.

A significant part of the prior art concerning the welding of polymer composite components with thermoplastic surfaces relates to the welding of thermoplastic composite components, where the surface is the same material type as the polymer matrix in the composite. While this process is conceptually simple, in practice it has proven to be unattractive, with high compaction pressures (usually 500 kPa or higher) required during welding to maintain the integrity of the components due to conduction of the welded zone heat away from the surface. Subsequent research has turned to the application of thermoplastic surfaces to thermosetting composites. An example of this process is described in U.S. Pat. No. 5,304, 269. This patent describes the partial embedding of thermoplastic and thermosetting resins into a layer of dry fibre reinforcement, along with compatible amorphous and semi-crystalline thermoplastics to make a weld. The process described in U.S. Pat. No. 5,643,390 includes establishing a semi-interpenetrating polymer network between an amorphous thermoplastic and the thermosetting polymer. Both of these techniques could be used to join thermosetting polymer composite components, and have the advantage that, in principle, lower welding pressures could be used to join components. However, in order to provide adhesive strength and high service temperature, high melting temperature semi-crystalline thermoplastics (in the case of U.S. Pat. No. 5,304, 269) and amorphous thermoplastics (in the case of U.S. Pat. No. 5,643,390) were used, where these in general had a softening temperature in excess of the degradation temperature of the thermosetting composite substrate.

In application both high temperatures and high pressures were required to create a quality weld. Unfortunately the use of high pressures in turn requires the use of substantial tooling to provide high-accuracy assemblies, making assembly more expensive, and in the above cases lessening the appeal of using of thermoplastic-surfaced thermosetting composites. This is particularly relevant to the assembly of aircraft components, which often have curvature or twist, and therefore require a means of assembly that accommodates these geometries.

The applicant has recently developed a process involving the integration of a semi-crystalline thermoplastic onto the surface of a thermosetting composite through the formation of a semi-interpenetrating polymer network. This process is described in applicant's international patent publication No. WO 03/011573, the contents of which are incorporated herein by reference. This process has several advantages including chemical resistance in service and ease of assembly, disassembly and reassembly. However, key advantages include the low welding pressures required to make an effective joint, with as little as 100 kPa required during the formation of a high-quality weld, and the ability to conduct welding outside a clean-room environment. It is now possible, therefore, to consider the low-cost assembly of thermoplastic-surfaced thermosetting composite components.

SUMMARY OF THE INVENTION

In preferred embodiments, the present invention provides an improved apparatus and process for joining of separate polymer composite components in a cost-effective manner. Furthermore the present invention advantageously provides a means for joining two or more composite components with a thermoplastic surface while maintaining tight assembly tolerances. A distinct advantage of this invention is the flexibility to join curved or twisted components, or complete the welding of closed assemblies such as wing boxes.

According to the invention there is provided an apparatus for the welding together of a plurality of polymer composite components, the composite components having adjacent thermoplastic surfaces in the vicinity of at least one intended weld joint, the apparatus comprising:

at least one location device having one or more locators to retain the plurality of composite components in a three dimensional arrangement;

a flexible pressure application device for transferring pressure to the adjacent thermoplastic surfaces to form the intended weld joint;

a heating device to raise the temperature locally at the thermoplastic surfaces to be welded; and a load bearing structure for supporting the pressure application device against at least one of the composite components in the vicinity of the intended weld joint.

Preferably, the flexible pressure application device transfers pressures not exceeding 400 kPa.

Advantageously, said location and pressure application devices and load bearing structure allow a three-dimensional arrangement for the assembly of composite components.

In a preferred form of this invention, the apparatus further comprises a rigid tooling member for constraining the at least one of the composite components against the flexible pressure application device Preferably the flexible pressure application device comprises at least one pressure bladder assembly having a flexible contact surface through which pressure is applied to the surface of the at least one composite component. In a preferred embodiment the flexible contact surface is on a flexible sheet fixed to a backing plate around the edges thereof to define an inflatable bladder space between the flexible sheet and the backing plate. In another preferred embodiment the flexible contact surface forms part of an inflatable tube contained within a stiff channel structure to define an inflatable pressure bladder assembly, such that inflation produces a force on the outer surface of the adjacent composite component. Preferably the flexible contact surface includes a polymer or reinforced polymer. More preferably said polymer is a silicone rubber.

In a preferred form in this invention, the pressure application device is situated to be local to regions on the composite components having thermoplastic surfaces for welding. In such an arrangement said location device is attached to said load bearing structure and provides at least a portion of load support to the composites components. Such an arrangement requires that the pressure application device includes a minimum of one pressure bladder assembly, and may therefore require the load bearing structure to be sufficiently stiff to maintain location precision of the composite components during assembly. In a further preferred form, a minimum of two pressure bladder assemblies are used for assembly, and more preferably two pressure bladder assemblies are arranged in opposition. A further preferred form of the invention is the arrangement of two pressure bladder assemblies in opposition sharing common pressurised fluid. In such an arrangement the majority of force is carried by the pressure bladder assemblies, such that said composite components are lightly held at location points on said location devices. Advantageously, this arrangement allows the use of lower stiffness location devices, and the use of at least some location devices that are not attached to the load bearing structure. More advantageously, when a low welding pressure is required for the assembly of thermoplastic surfaced composite components using the abovementioned arrangement of pressure bladder assemblies, the location devices may be lower in stiffness. In a preferred embodiment, the pressure application device supplies between 50 kPa and 400 kPa welding pressure, more preferably between 50 kPa and 300 kPa welding pressure and most preferably between 50 kPa and 200 kPa welding pressure.

The heating device is preferably arranged to provide heat locally to the thermoplastic surfaces to be welded. This can be achieved by heating methods localised to the thermoplastic including induction welding, RF or resistance heating, using embedded material within the weld line. In a preferred form of this invention, the heating device is a shaped or flexible heating element that intimately contacts the outer surface of at least one composite component in the vicinity of the weld region. More preferably, the heating device includes a flexible heating sheet to provide heat for transfer through the at least one composite component. In general with the provision of a flexible heating device, the pressure assembly bears against the heating device. In another preferred form of this invention, the heating device is such a flexible heating sheet integrated into the pressure bladder assembly. A further preferred embodiment provides that a heated fluid is used to inflate the pressure application device and simultaneously apply heat to the outer surface of at least one composite component. For the purposes of this specification, fluid is defined as a liquid or gaseous substance.

Preferably the load bearing structure for supporting the pressure application device comprises at least one form block, the form block being supported against the load bearing structure and positioned to be able support the pressure application device to the at least one component structure in the vicinity of the intended weld joint.

The form block is generally shaped to the approximate profile of the outer surface of the adjacent composite component, and is preferred where the geometry of the composite component to be welded is curved or twisted in its outer profile. In a preferred embodiment the position of the form blocks is adjustable horizontally and vertically to accommodate different three dimensional arrangements of composite structures and weld joints to be welded. Advantageously, such form blocks when combined with one or more flexible pressure bladder assemblies provides for the assembly of curved and twisted composite components using lightweight and inexpensive tooling.

Location devices may be used separately to locate an individual composite component in three dimensional space relative to other composite components to be assembled, or may be used to temporarily or permanently attach two or more composite components together and relative to each other in at least one point, or may be a combination of the above methods. Advantageously the location devices provide a precise location of the composite components in the three dimensional arrangement, and more advantageously allow for the welding of a composite structure in more than one location and on more than one plane. In a preferred embodiment a location device comprises a mechanical fastener such as a rivet or bolt, or a temporary mechanical fastener. Where a mechanical fastener is used as a location device, the location device may form part of the assembled composite structure. In a more preferred embodiment, a temporary mechanical fastener with a sprung mating surface is used, that allows composite components when welded to move slightly relative to each other and thereby allow sinkage of one component into the molten thermoplastic surface of the other. In another preferred embodiment a location device is a tooling post onto which a composite component is temporarily fastened. In a further preferred embodiment, a removable tooling post is used as a location device. Advantageously, the removable tooling post may be removed after completion of a portion of welding and attainment of sufficient welded structure stability, to allow welding in a region where the continued presence of the tooling post would otherwise cause interference. Although the positional accuracy (the linear distance between the desired and actual position) will vary depending upon the nature (composition and size) of the particular components to be welded, the location devices are used to obtain positional accuracy of a first composite component relative to a second composite component preferably less than 0.5 mm, more preferably less than 0.2 mm, and most preferably less than 0.1 mm.

In another aspect of the invention there is provided a method for welding a first composite component with a thermoplastic surface to a second composite component with a thermoplastic surface including the steps of:

locating the first composite component adjacent to the second composite component using a location device such that the respective thermoplastic surfaces are in contact;

applying a fluid inflated apparatus to at least the first composite component to transfer pressure through the first composite component to the contacting thermoplastic surfaces;

applying a heating device to at least the first composite component to raise the temperature of the contacting thermoplastic surfaces to cause them to flow;

the applied heat and pressure resulting in joining and healing of the adjacent thermoplastic surfaces and cooling the first and/or second components under pressure to obtain a welded assembly.

In a preferred embodiment, the method of the invention provides for the assembly of composite components wherein at least one composite component is a thermoset composite with a thermoplastic surface, the thermoplastic surface including at least one of the contacting thermoplastic surfaces.

Preferably at least first and second composite components are located in a three dimensional arrangement. In a preferred embodiment the method of the invention provides for a plurality of composite components with thermoplastic surfaces positioned in a three dimensional arrangement, the heating and fluid inflated pressure apparatus being applied to the three dimensional arrangement of composite components to allow application of forces to the welded assembly.

Advantageously, the composite components are located accurately relative to each other with location devices in the assembly apparatus. During the welding process of a thermoplastic surfaced composite, some minor relative movement will generally be experienced between adjoining components, known as sinkage. In a preferred embodiment, the location of the composite components prior to welding is adjusted to account for sinkage during the process of welding, and the components are accordingly fastened to allow for such relative movement.

In accordance with the method of the invention, at least two composite components are welded with a pressure application device being located against at least one of the composite components in the vicinity of the intended welded joint acting on the outer surface of said component. The second component may be supported through features such as form blocks or a rigid tooling member attached to the load bearing structure, the pressure application device similarly being supported by the load bearing structure. In another preferred embodiment, pressure is applied to intended welded joints by the application of opposed pressure bladder assemblies supported by the load bearing structure, one location device being located against at least one of the composite components in the vicinity of the intended welded joint. Advantageously, this embodiment allows for fixing the position of the composite components with lightweight location devices while simultaneously allowing for sinkage during the welding operation. A further preferred embodiment of the current invention provides for assembly with opposed pressure bladders wherein at least the two opposed pressure bladder assemblies share common pressurised fluid. Advantageously, this arrangement of pressure bladders provides balanced loads across the assembly, such that lightweight location devices, or location devices that form part of the assembly and are not otherwise attached to the load bearing structure, may be used during assembly.

Advantageously, the flexibility of application of location devices allows the establishment of more than one joint area in more than one plane. In a preferred embodiment, welding of thermoplastic surfaces occurs on more than one plane, either sequentially or simultaneously.

The application of heat to the thermoplastic surfaces to be welded comprises part of the invention. The temperature of the thermoplastic surfaces may be raised locally to a temperature sufficient for welding through inclusion of additional material in the joint region to allow induction heating, RF heating, resistance heating or a similar method of local heating. Preferably, heat is applied to the outer surface of the at least one composite component, the applied heat being subsequently conducted through the at least one composite component to the thermoplastic surface or surfaces to be welded. Advantageously, this allows for the heating device to be placed in contact with the outer surface of the composite component to be welded.

Where the composite components with thermoplastic surfaces require low pressure to achieve welding of the adjacent thermoplastic surfaces, the composite components themselves may be sufficiently stiff that little or no supporting structure is required to effect an accurate assembly. Advantageously, this allows one or more locators to be used that are lightweight or may form part of the composite assembly, such as a rivet or mechanical fastener. Preferably the composite assembly is welded with a welding pressure 200 kPa and lower, and more preferably 100 kPa and lower The invention in another aspect includes a composite assembly manufactured using the aforementioned apparatus.

The invention in another aspect includes a composite assembly manufactured according to the method described above.

BRIEF DESCRIPTION OF THE DRAWINGS

The invention will now be described, by way of example only, with reference to the accompanying drawings in which.

DETAILED DESCRIPTION OF THE EMBODIMENTS

Figure 1A:
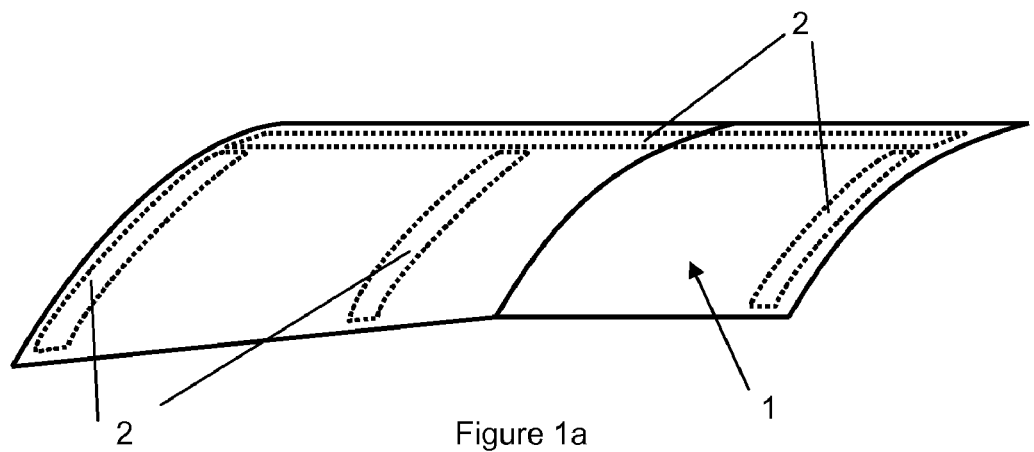
FIGS. 1a to 1c illustrate a curved geometry of three example components (skin, rib and spar) that may be welded together using the present invention.
Figure 1B:
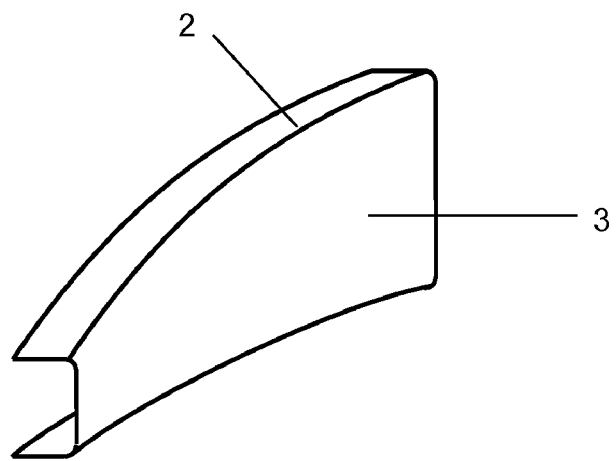
Figure 1C:
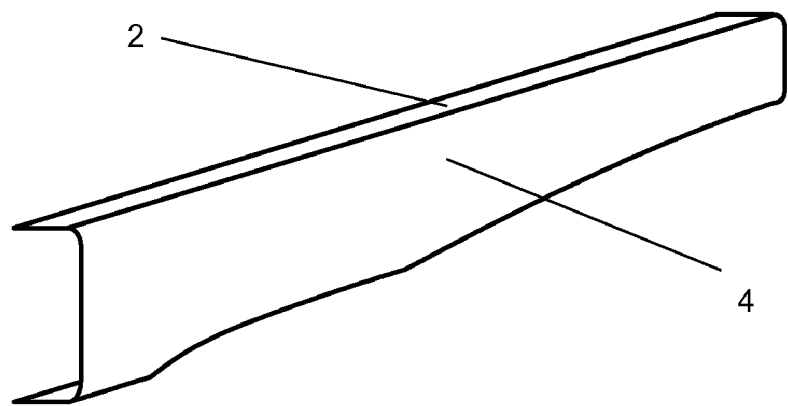

The following description of an apparatus is specifically related to the joining of the components in FIGS. 1a to 1c, namely, a single spar, three ribs and a skin of a section of an aircraft flap. It will be apparent that specific actions taken in the assembly of these components do not define the joining process, but are merely an example of the process.

Figure 2A:
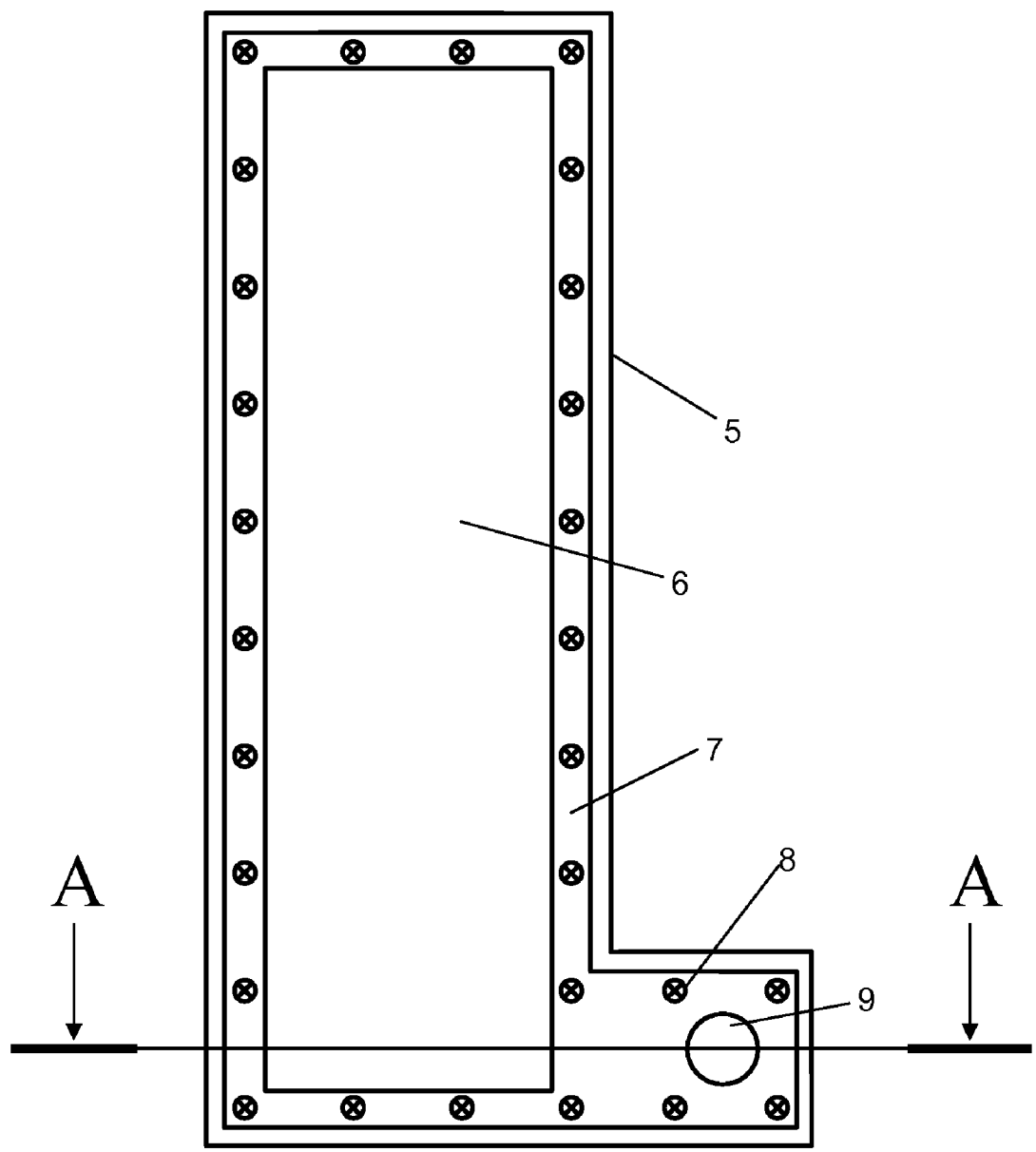
FIGS. 2a and 2b illustrate an inflatable pressure application system according to an embodiment of the present invention.
Figure 2B:
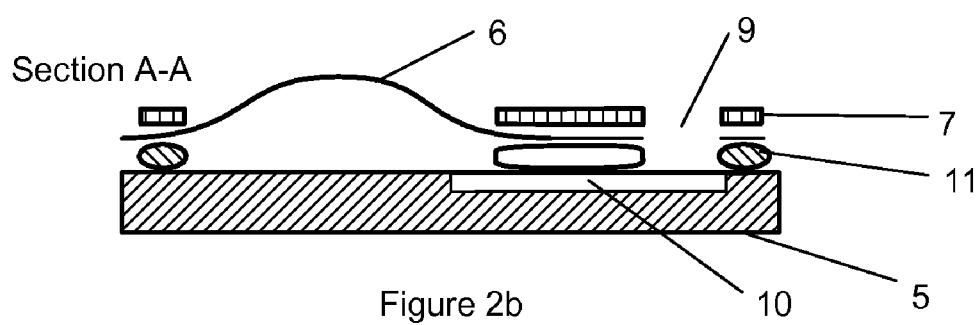

An example of a pressure application device for the welding of composite components into an assembly is shown schematically in FIG. 2a. This includes of an elastomeric or other flexible substance 6 in the form of a sheet that is affixed along its edges to a backing plate 5 of substantially higher stiffness. The elastomeric material 6 may be a silicone rubber, while the backing plate 5 may be a glass fibre composite, carbon fibre composite or metal that may be flat or contoured. The area of pressure application is defined by a frame 7 that is fastened to the elastomeric material and backing plate, usually with mechanical fasteners 8. A hole 9 in the frame 7 and elastomeric material 6 allows the elastomeric material 6 to be inflated. FIG. 2b shows a section view through the inflation hole 9. The backing plate 5 may have a depression 10 in the vicinity of the hole 9 to allow easy inflation of the elastomeric material 6. Between the elastomeric material 6 and the backing plate 5 at the edges is a sealant 11 such as a silicone sealant. This may also be present between the frame 7 and the elastomeric material 6. It will be appreciated that the example shown in FIG. 2 and elastomeric material 6 is one of a variety of forms that may be utilised. Another example is a tube made of elastomeric material contained in a stiff C-channel, such that inflation of the tube results in the application of pressure upon an object located against the open side of the channel. However the use of an elastomeric sheet attached to a shaped backing plate allows simpler shaping of the pressure application device to curved and twisted composite components, increasing consistency of pressure application to such components. Where the backing plate 5 is manufactured from a composite material, it may be manufactured to the required shape using the tool for manufacturing the composite component to be placed under pressure, such that the same curve and twist profile is achieved. When inflated, the elastomeric material 6 is able to conform to the shape of the adjacent composite component being assembled, thereby applying even pressure to the component in the region of the weld. The specified apparatus is particularly suited to composite assemblies requiring low welding pressure, preferably 200 kPa and lower, and more preferably 100 kPa and lower.

Figure 3A:
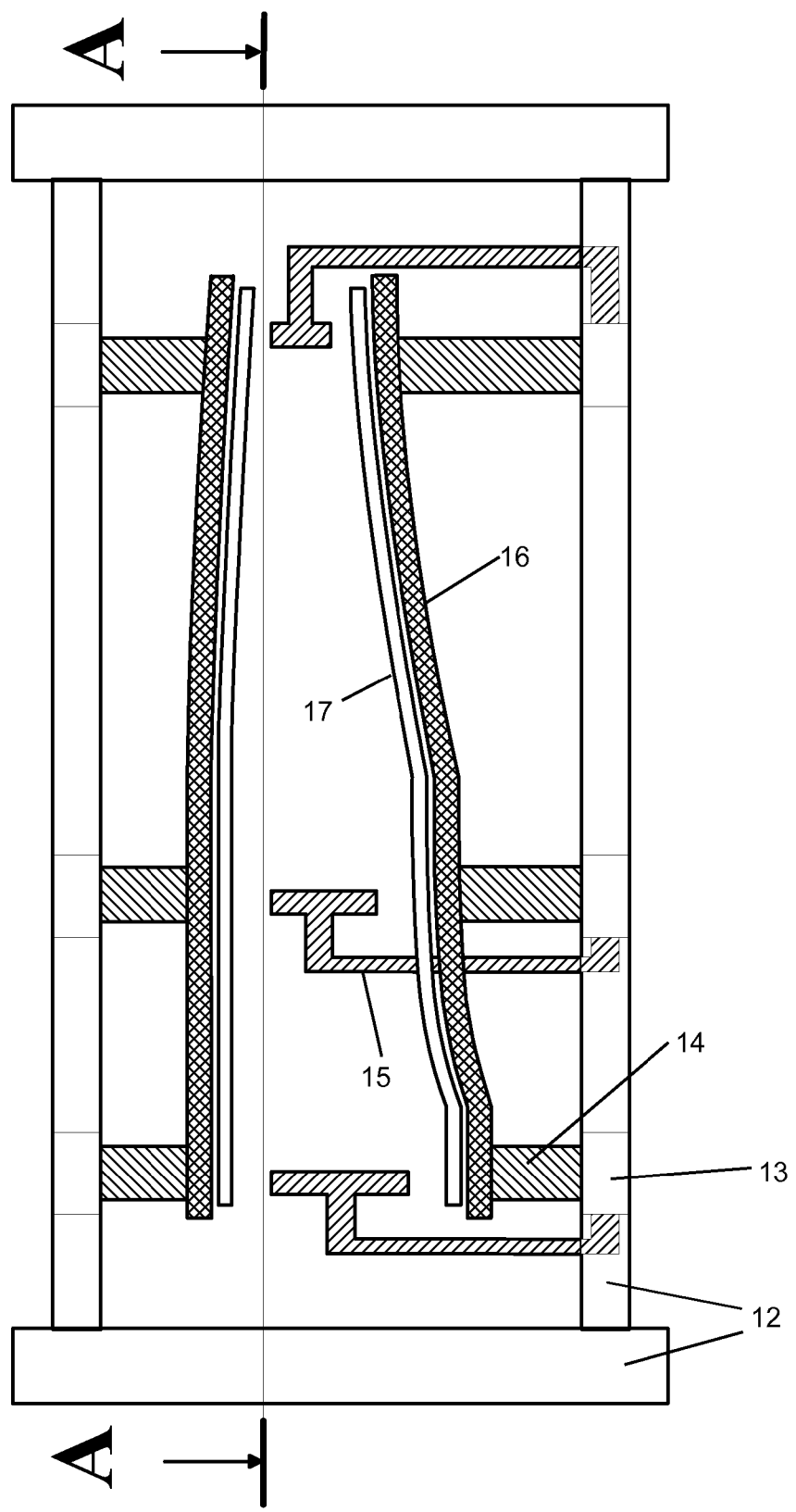
FIGS. 3a and 3b are schematic illustrations of a welding frame and fixtures for application of pressure and heat according to an embodiment of the present invention.
Figure 3B:
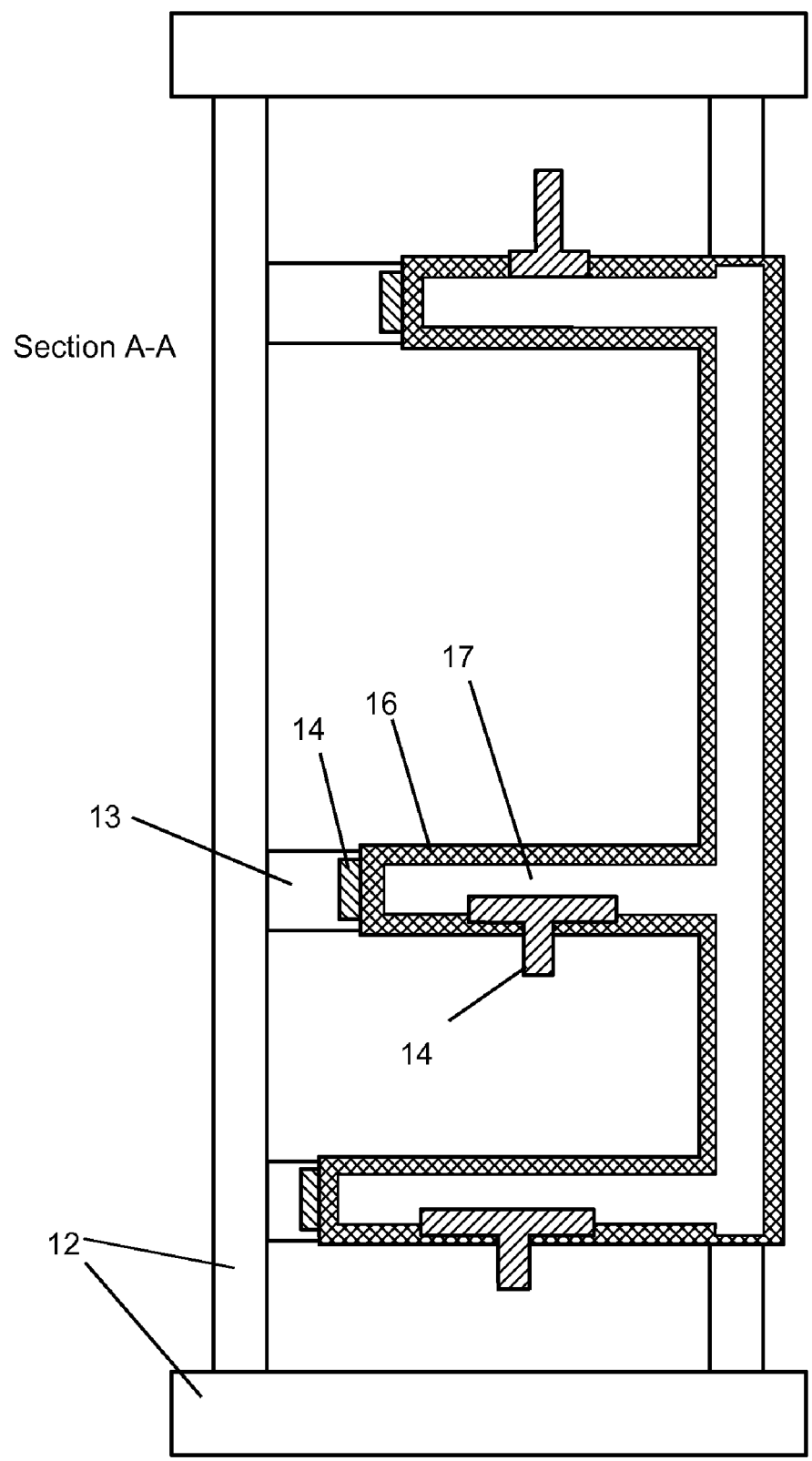

The apparatus used to conduct the welding process according to a preferred embodiment of the present invention includes, as a minimum, of a load-bearing structure, a flexible contact surface through which pressure is applied, a location device for the relative location of composite components and a flexible heating element, although in application the flexible contact surface and heating element may be integrated. Referring to FIGS. 3a and 3b the welding frame 12 is used as a reaction frame for the applied pressure required to perform the weld.

It is feasible within the scope of the invention to support at least some components directly on the load bearing structure. More preferably, composite components may be constrained against a rigid tooling member, and one or more pressure bladder assemblies used from one side of the assembly to apply pressure. This scenario is particularly useful when the components to be joined are flat on the outer surface or joint region. The example apparatus depicted in FIG. 3 is designed for the more complex scenario of welding of a highly curved or twisted composite assembly, where welding is required on two separate planes. The frame has a number of support beams 13 that are used for location of form blocks 14, which are formed to the approximate shape of the outer assembly geometry 1. These form blocks 14 will be ideally made of a material that provides some thermal insulation between the welding region and the steel frame, for example wood or a glass/phenolic composite. The form blocks 14 need not be permanently fixed to the frame, allowing reconfiguration of the welding assembly to suit multiple configurations, including the welding of structures with slight changes in geometry curvature and twist. On top of the form blocks 14 rests a pressure bladder assembly 16, an example of which was shown in greater detail in FIG. 2.

The fluid used to inflate the bladder may also be used to provide heat, for example a heated oil under pressure may be pumped through the pressure bladder assembly 16, such that the inflation medium for the pressure application assembly is simultaneously used to apply heat to the outer composite component in the region of the assembly weld. There may be one or more holes 9 in the bladder assembly 16 for the pressure fluid. Where the pressure fluid is not also used to apply heat, an alternative means of applying heat to the joint may be used. Techniques including induction heating, FR heating and resistance heating are compatible with the apparatus detailed in the invention, with the addition of suitable material in the vicinity of the thermoplastic welding material. However when a thermally stable composite component with a thermoplastic welding surface is being welded using the method and apparatus of the present invention, it becomes feasible to conduct heat through the thickness of one component to the welding line. In this instance thermal stability refers to the ability of composite components to endure high temperatures without undue degradation or distortion. Examples of such composite components include high cure temperature thermosetting composites with integrated thermoplastic surfaces, and thermoplastic composite components having thermoplastic surfaces of lower melting temperature than the bulk thermoplastic matrix of the composite component. In these instances, and as a preferred embodiment of the invention, a flexible heating element 17 may be placed between the bladder assembly 16 and the composite component to be welded. An alternative is that the heating element is integrated into the elastomeric bladder 6, rather than being separate to the bladder assembly 16. A flexible heating element will ideally include two films of a high temperature polymer, such as a polyimide or a silicone rubber, where one film has a metallic circuit located on it, and the other film is adhesively bonded to the first film, forming an insulated heating element. The heating processes described above may be used alone or in combination. Any of these methods can be used in the welding process where sufficient heat is attained on the thermoplastic surfaces of the adjacent components to result in the melting of both surfaces, and their subsequent healing. Where a heating element is used external to the components i.e. is not contained within the bond line, the heating element is ideally sufficiently flexible to be placed between the pressure bladder assembly 16 and the components to be welded.

Figure 4:
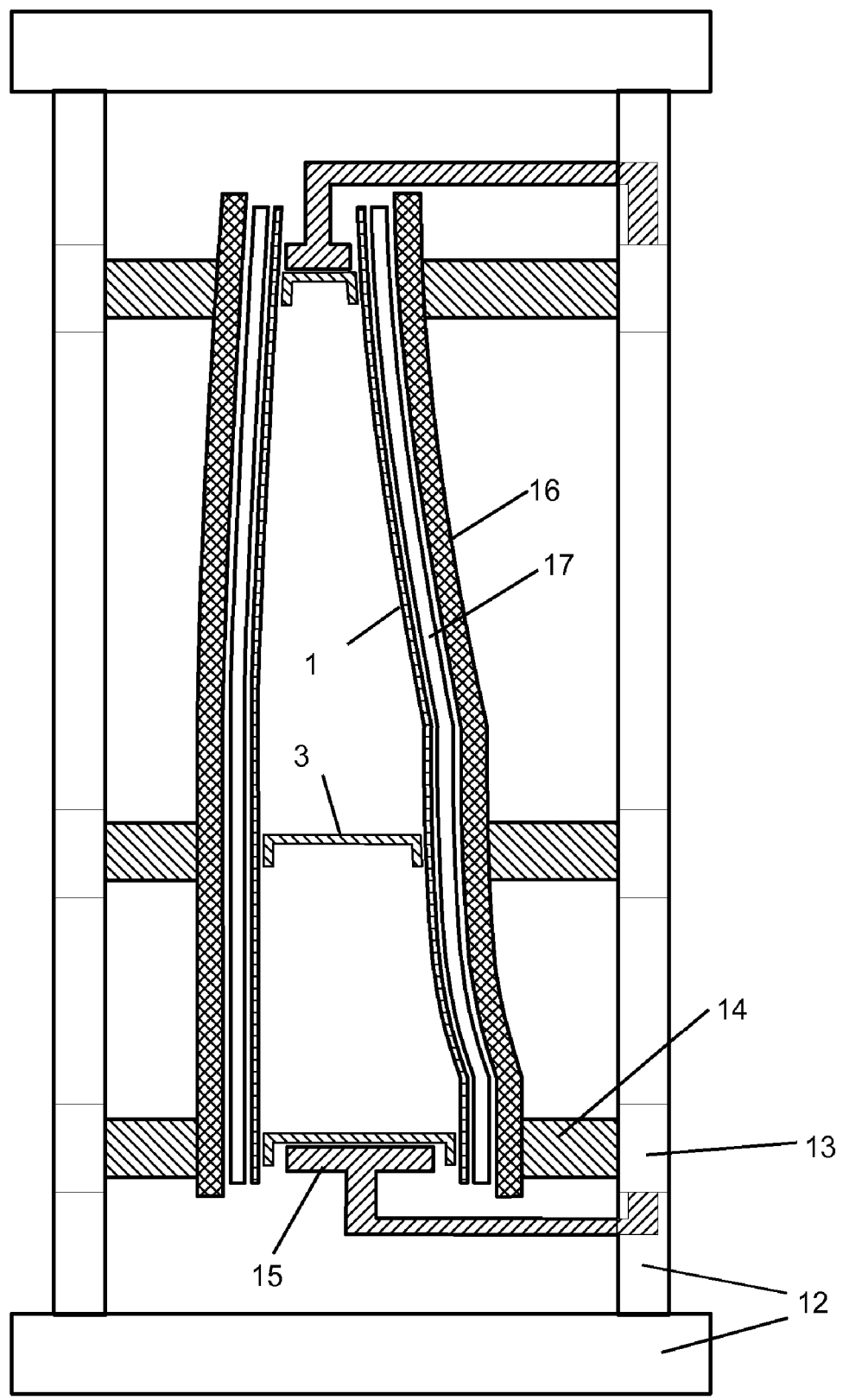
FIG. 4 is a schematic illustration of a welding frame, fixtures for application of heat and pressure, and skin and rib components for an example assembled composite component according to an embodiment of the present invention.

The process of joining the highly curved skin and rib components displayed in FIG. 1 is shown schematically in FIG. 4. The process first involves location of the rib 3 onto a tooling post 15. The tooling post 15 is positioned and shaped to provide accurate location in all six axes of movement of the rib. Each rib 3 is located onto its tooling post 15. Next the spar (not shown in FIG. 4) is affixed to the ribs 3, to form an assembled substructure. This can be done through welding, but it is often convenient for this step to be completed with mechanical fasteners. At this stage, several thermoplastic surfaces 2 are located in position for welding to the skin 1. The skin 1 and assembled ribs 3 and spar are located relative to one another so that the thermoplastic surfaces of the ribs 3 and skin 1 are brought into contact. It is generally convenient to apply temporary fasteners that have a sprung mating surface, which is replaced with a permanent fastener following completion of the welding process. As the welding commences between the skin and assembled substructure, the skin will move minutely towards the assembled substructure as the thermoplastic on the respective surfaces begins to melt. Were a mechanical fastener to be used, this may subsequently become loose following completion of welding.

In the present example, the pressure bladder device 16 and heating system 17 is brought into direct contact with the skin, with opposed pressure bladder assembly and heating devices used for the welding of two skin 1 components. The opposed pressure bladder devices using the apparatus of the present invention have a shared source of pressurised fluid. Where the inflation distance of the opposed pressure bladder assemblies 16 for contacting the composite components to be assembled is approximately equal, this will result in the compression of the skin component 1 against the substructure in a "floating" arrangement. The substructure does not, using this apparatus, need to have a high level of attachment to its locators 15 in order to maintain its position, as the forces across the composite assembly are mostly balanced by the placement of the pressure bladder assemblies 16. This requires, however, that the final position of the skin component 1 or any similar component be determined by allowing for the relative movement of such a component towards the assembled substructure or equivalent during the welding operation. Such "sinkage" can be determined through simple squeeze flow models of thermoplastic in the melt state.

After applying the required welding pressure, the temperature of the bondline is raised to allow the thermoplastic surfaces to flow and heal. The temperature of the bondline is then allowed to cool while pressure is maintained. When sufficient cooling has occurred, the pressure is removed and the welded assembly can be removed from the fixture.

It will be apparent from FIG. 3 that the tooling posts 15 in the centre of an assembly would interfere with the welding of a lower skin. For this reason the posts may be designed to be removable once the welding of the upper skin is complete, while the outer posts remain in place. FIG. 4 shows the process of assembly with the centre tooling post removed. Once the box structure has one skin attached to it (the upper skin in FIG. 4), the partial assembly may be sufficiently rigid to allow removing of some internal location fixtures without unduly affecting the ability to maintain dimensional tolerance. An alternative to this concept is a design that allows a locating pole or equivalent to be passed along the length of the structure, with closing side elements added as the final step in the assembly. A method such as this would allow simultaneous welding of the upper and lower skins of a box structure, which can provide further cost savings in assembly. Furthermore components may be simply located relative to other components by spaced temporary or permanent mechanical fasteners. The flexibility and configurability of pressure application and location devices in the current method is an intrinsic advantage of the current method of assembly.

A particular feature of the welding process is that the pressure application devices may be placed in an opposing arrangement, so that forces on each side of the assembly to be bonded will be applied hydraulically or pneumatically, and these constitute the majority of the forces on the components being welded. This technique by design does not require exact matching of the outer geometry of the assembly to support tooling, while providing a consistent force through the assembly elements. This technique in part is feasible due to the stiffness of the composite components being joined. This is a useful feature in the assembly of aircraft and other components where some level of curvature is often present, and which curvature may change with the temperature of the components. This feature also allows for the use of less substantial location tooling than would be required if the tooling was also used to react the bonding forces. In principle the assembly "floats" between the pressure bladder assemblies, yet the location of the composite elements is maintained by the location features. The design of the location posts or other location features can therefore be better optimism for heat transfer properties and location accuracy. Furthermore, as mentioned above, cost saving measures such as the simultaneous welding of an upper and lower skin on a box structure can be achieved through use of this method and its associated apparatus.

A further particular feature of the welding process and apparatus concerns the assembly of components under low pressure. Where a thermoset composite component has an included thermoplastic surface, or a thermoplastic composite component has an included thermoplastic surface of lower melt temperature than the composite matrix, welding pressures need not be high to effect a high strength weld. For thermoset composite components with thermoplastic surfaces, 100-200 kPa pressure at the weld interface may be sufficient to provide high strength attachment between composite components. In these instances, and referring to FIG. 4, structures such as ribs 3 may be curved and thereby have an inherent flexural stiffness. This allows for a minimum of supporting tooling to be used to accurately weld such structures together.

EXAMPLE

A composite assembly was manufactured using three curved carbon/epoxy composite ribs of differing radius, a single carbon/epoxy spar, and one curved carbon/epoxy skin. The smallest rib had a radius of curvature of approximately 300 mm on its upper surface. Each composite component was manufactured from a stack of 10 plies of Hexcel plain-weave carbon fibre/F593-18 epoxy prepreg, and shaped using appropriate curing tools. The region to be welded on each component had a 0.125 mm thickness layer of PVDF thermoplastic polymer. The components were individually cured at 630 kPa pressure and 177° C. for 2 hours. After curing, the thermoplastic polymer was intimately attached to the underlying carbon/epoxy of each component.

An apparatus was constructed for the purpose of welding a thermoset composite assembly whose components had thermoplastic surfaces in the welding regions, including a load bearing structure constructed of tubular steel, form block of wood, an inflatable bladder assembly for application of pressure, heating elements, and location fixtures. Steel crossmembers were located above and below the location of welding regions, and securely fixed to the load bearing structure. Location posts were attached to the steel cross-members, such that plates with location holes were available for the accurate location of the composite ribs. In two cases the plates on the location posts were made from aluminium, in the third case the location plate was manufactured from a phenolic composite, so that heat transfer through the plate and location post was minimised. The centre location post was removable, such that a lower skin could be welded following completion of the upper skin weld.

Each of the composite ribs was located on its respective tooling post. The spar was accurately located using temporary location tools, and then holes drilled to allow fastening between the ribs and spar. The spar was permanently mechanically fastened to the ribs. The upper skin was then accurately located on the rib/spar substructure, with holes drilled through the skin and spar to provide temporary location. Temporary fasteners, with a compressed elastomeric base attached to the underside, were used to provide location of the skin to the rib/spar substructure while allowing for sinkage of the skin against the rib/spar substructure during subsequent welding operations.

Form blocks were located on the steel cross-members, shaped to approximately the shape of the outer surface of the composite components. Two pressure bladder assemblies were attached to the form blocks. The bladder assemblies includes a backing plate manufactured from a glass fibre thermoset composite, reinforced silicone rubber sheet, silicone sealant, a glass fibre thermoset edge frame, and mechanical fasteners. A pneumatic tube was attached to each of the bladder assemblies, and connected to a compressed air source through a pressure regulator. The pneumatic tubes to the two bladder assemblies were joined at the exit of the pressure regulator, such that the two bladder assemblies shared common compressed air.

Flexible heater elements, including a resistance foil sandwiched between two polyimide films (approximate combined thickness 160 μm) were placed in the region of welding between the upper skin and the inflatable bladder assemblies, corresponding to the weld interfaces between each of the ribs and skin, as well as the spar and skin. The pressure in the bladder assemblies was raised to 70 kPa, which corresponded to a pressure at the weld interface of 100 kPa. Upon inflation, the surface of the bladder assembly conformed to the surface profile of the composite skin. The heater elements were brought to a temperature of 220° C., resulting in a weld line temperature of between 185 and 195° C., due to transmission of heat through the composite skin from the flexible heaters. The temperature and pressure were maintained for 10 minutes, during which time the thermoplastic surfaces melted and coalesced. Upon cooling under pressure, the thermoplastic resolidified resulting in a welded composite assembly.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. An apparatus for welding together a plurality of as-formed polymer composite components, the as-formed composite components having adjacent thermoplastic surfaces in vicinity of at least one intended weld joint, the apparatus comprising:
   at least one location device having one or more locators to retain a plurality of as-formed composite components to be welded, at the adjacent thermoplastic surfaces thereof, in a three dimensional arrangement relative to each other;
   a flexible pressure application device for transferring pressure to each of the adjacent thermoplastic surfaces so as to urge the adjacent thermoplastic surfaces together to form the intended weld joint;
   a heating device configured to raise a temperature locally at the adjacent thermoplastic surfaces to be welded, in cooperation with the flexible pressure application device urging the adjacent thermoplastic surfaces together, and to weld the adjacent thermoplastic surfaces of the as-formed composite components together;
   a load bearing structure for supporting the flexible pressure application device against at least one of the as-formed composite components in the vicinity of the intended weld joint;
   wherein the flexible pressure application device comprises at least one pressure bladder assembly, each assembly having a flexible contact surface through which pressure is applied to the surface of the at least one as-formed composite component; and
   wherein the heating device is integrated into the pressure bladder assembly.

2. An apparatus for welding together a plurality of as-formed polymer composite components, the as-formed composite components having adjacent thermoplastic surfaces in vicinity of at least one intended weld joint, the apparatus comprising:
   at least one location device having one or more locators to retain a plurality of as-formed composite components to be welded, at the adjacent thermoplastic surfaces thereof, in a three dimensional arrangement relative to each other;
   a flexible pressure application device for transferring pressure to each of the adjacent thermoplastic surfaces so as to urge the adjacent thermoplastic surfaces together to form the intended weld joint;
   a heating device configured to raise a temperature locally at the adjacent thermoplastic surfaces to be welded, in cooperation with the flexible pressure application device urging the adjacent thermoplastic surfaces together, and to weld the adjacent thermoplastic surfaces of the as-formed composite components together;
   a load bearing structure for supporting the flexible pressure application device against at least one of the as-formed composite components in the vicinity of the intended weld joint;
   wherein the flexible pressure application device comprises at least one pressure bladder assembly, each assembly having a flexible contact surface through which pressure is applied to the surface of the at least one as-formed composite component; and
   wherein a heated fluid is used to inflate the pressure application device and simultaneously apply heat to the outer surface of at least one as-formed composite component.

3. An apparatus for welding together a plurality of as-formed polymer composite components, the as-formed composite components having adjacent thermoplastic surfaces in vicinity of at least one intended weld joint, the apparatus comprising:
   at least one location device having one or more locators to retain a plurality of as-formed composite components to be welded, at the adjacent thermoplastic surfaces thereof, in a three dimensional arrangement relative to each other;
   a flexible pressure application device for transferring pressure to each of the adjacent thermoplastic surfaces so as to urge the adjacent thermoplastic surfaces together to form the intended weld joint;
   a heating device configured to raise a temperature locally at the adjacent thermoplastic surfaces to be welded, in cooperation with the flexible pressure application device urging the adjacent thermoplastic surfaces together, and to weld the adjacent thermoplastic surfaces of the as-formed composite components together;
   a load bearing structure for supporting the flexible pressure application device against at least one of the as-formed composite components in the vicinity of the intended weld joint;
   wherein the load bearing structure for supporting the heating device and pressure application device comprises at least one form block, the form block being supported against the load bearing structure and positioned to be able to apply pressure to the at least one as-formed component structure in the vicinity of the intended weld joint; and
   wherein the position of the form block is adjustable horizontally and vertically to accommodate different three dimensional arrangements of as-formed composite structures and weld joints to be welded.

* * * * *

UNITED STATES PATENT AND TRADEMARK OFFICE
CERTIFICATE OF CORRECTION

| | |
|---|---|
| PATENT NO. | : 7,921,893 B2 |
| APPLICATION NO. | : 11/534397 |
| DATED | : April 12, 2011 |
| INVENTOR(S) | : Beehag et al. |

It is certified that error appears in the above-identified patent and that said Letters Patent is hereby corrected as shown below:

Column 9,
Line 65, "optimism" should read --optimised--.

Signed and Sealed this
Fourth Day of October, 2011

David J. Kappos
*Director of the United States Patent and Trademark Office*